Sept. 16, 1958          E. S. GANDRUD          2,852,166
DISPENSER FOR GRANULAR OR POWDERED MATERIAL
Filed Oct. 18, 1956          2 Sheets-Sheet 2
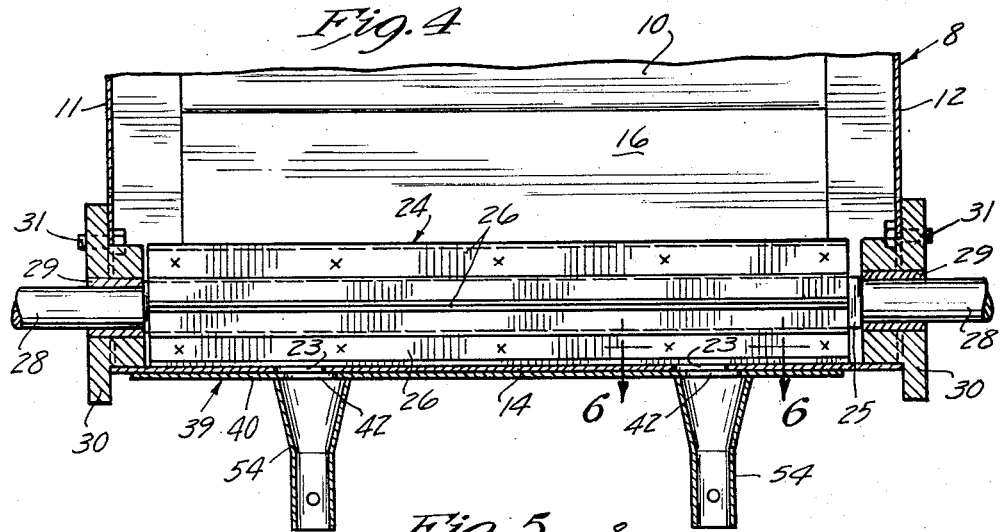
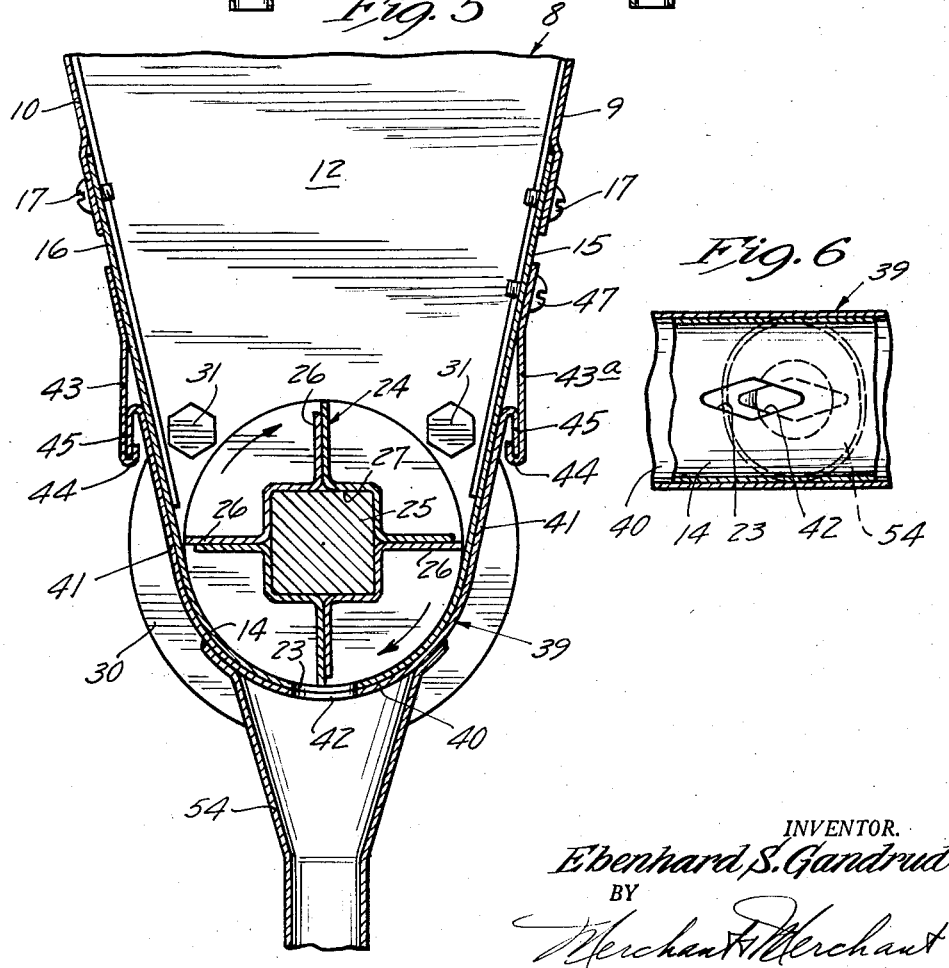
INVENTOR.
Ebenhard S. Gandrud
BY
Merchant & Merchant
ATTORNEYS

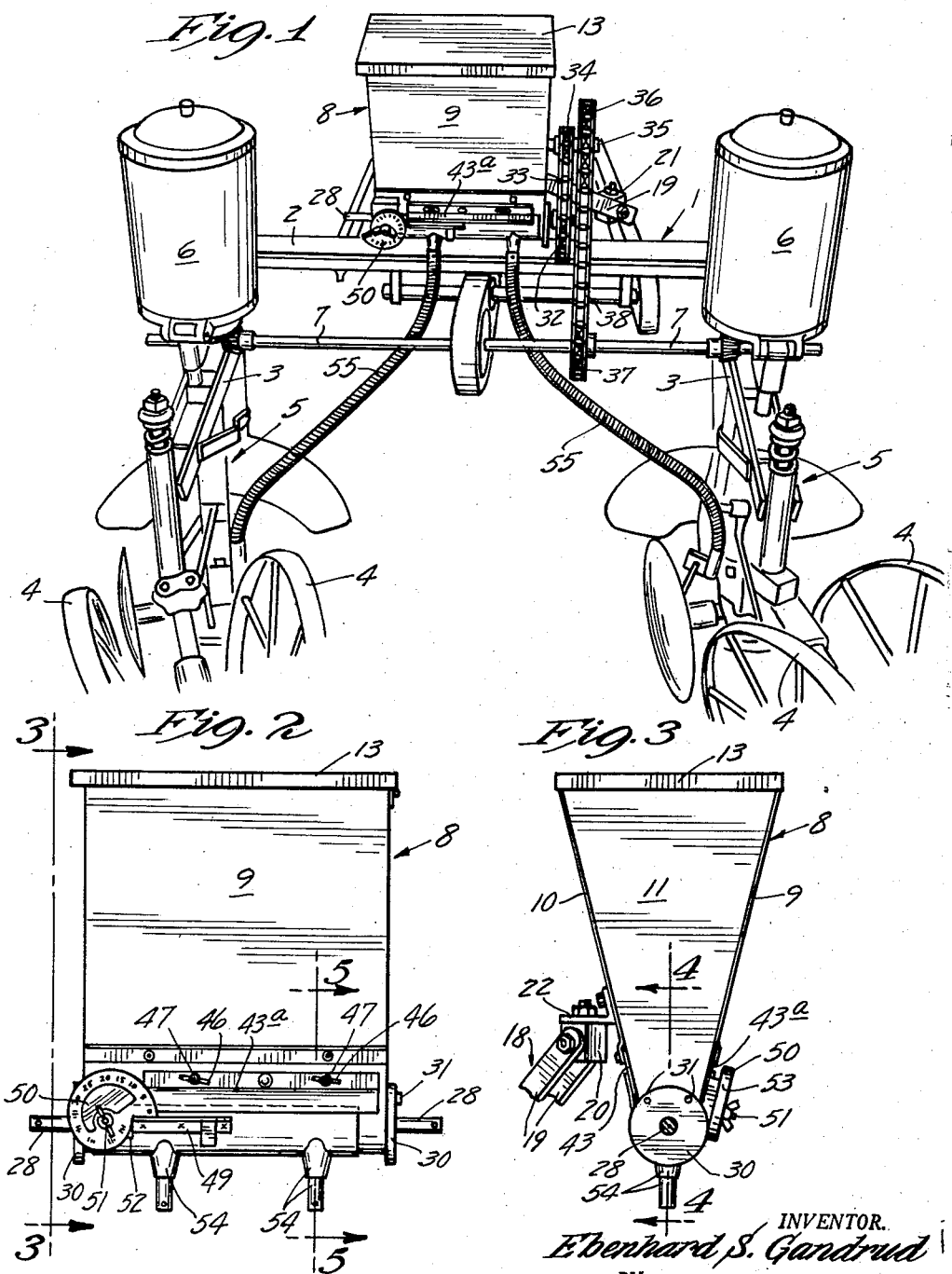

United States Patent Office 2,852,166
Patented Sept. 16, 1958

2,852,166
DISPENSER FOR GRANULAR OR POWDERED MATERIAL

Ebenhard S. Gandrud, Owatonna, Minn.

Application October 18, 1956, Serial No. 616,678

1 Claim. (Cl. 222—311)

My invention relates generally to agricultural equipment, and more particularly to apparatus adapted to be mounted on agricultural implements to supplement the functions thereof.

More specifically, my present invention relates to dispensers for granular or powdered material, and which are adapted to be mounted on such machines as row crop planters, listers and the like, for the purpose of adding desired material such as granular insecticide or the like to other material being planted or otherwise delivered to the soil, or to growing plant life.

An important object of my invention is the provision of a dispenser as set forth which may be easily mounted on an implement, and which will deliver accurately metered quantities of material to the ground or to plants to be treated.

Another object of my invention is the provision of a dispenser having a feed rate control valve gate which is easily and quickly adjusted to obtain the desired feed rate.

Another object of my invention is the provision of a dispenser of the above type in which the valve gate is easily removed for cleaning and as easily replaced.

Another object of my invention is the provision of a valve gate as set forth having flexible tubular conductors thereon whereby metered quantities of material may be delivered to the desired area.

Another object of my invention is the provision of a dispenser of type herein described which is relatively simple and inexpensive to manufacture and install, which is highly efficient in operation, and which is rugged in construction and durable in use.

The above, and still further highly important object and advantages of my invention will become apparent from the following detailed specification, appended claim, and attached drawings.

Referring to the drawings, which illustrate the invention, and in which like characters indicate like parts throughout the several views:

Fig. 1 is a fragmentary view in perspective of a planting machine, showing my dispenser mounted thereon;

Fig. 2 is an enlarged view in side elevation of my dispenser disassociated from the machine of Fig. 1;

Fig. 3 is a view in end elevation as seen from the line 3—3 of Fig. 2;

Fig. 4 is an enlarged fragmentary section, taken substantially on the line 4—4 of Fig. 3;

Fig. 5 is an enlarged fragmentary transverse section taken substantially on the line 5—5 of Fig. 2; and Fig. 6 is an enlarged fragmentary detail in section taken substantially on the line 6—6 of Fig. 4, some parts being removed.

Referring with greater detail to the drawings, the numeral 1 indicates, in its entirety, a seed planting machine including a cross frame member 2, opposite end frames 3, supported by ground engaging wheels 4, and seed planting apparatus indicated generally at 5, including feeding hoppers 6 therefor. The planting mechanisms 5 are operated by a drive shaft 7 that is operatively connected to the wheels 4 by suitable driving connections, not shown. The above described machine may be any one of a number of types commonly used in agriculture and, in itself, does not comprise the instant invention. Hence, for the sake of brevity, further detailed showing and description thereof is omitted. The machine is adapted to be connected to the drawbar hitch of a tractor or the like for movement therewith over a field.

My improved dispenser comprises a hopper, indicated in its entirety by the numeral 8 and including opposed downwardly tapering sidewalls 9 and 10, opposed end walls 11 and 12, a hinged cover 13, and an arcuate bottom section 14. The arcuate bottom section 14 is provided with tangential upwardly diverging flanges 15 and 16 that are removably secured to the lower edge portion of the side walls 9 and 10 respectively by sheet metal screws or the like 17. The hopper 8 is mounted on the frame of the machine 1 by a mounting bracket 18 comprising a pair of laterally spaced mounting blocks 20 and 21 respectively, the former of which is bolted or otherwise rigidly anchored to a mounting flange 22 that is secured to the side wall 10 of the hopper 8, see Fig. 3, and the latter of which is bolted or otherwise rigidly secured to the frame of the machine 1, see Fig. 1. The arcuate bottom portion 14 of the hopper is provided with one or more longitudinally spaced, generally diamond shaped discharge openings 23, see Figs. 4–6.

Rotatively mounted in the bottom portion of the hopper 8 is a feeding rotor 24 comprising a cross sectionally polygonal central shaft 25 and a plurality of axially extended feeding vanes 26 which project radially outwardly from the central shaft 25. The feeding vanes 26 are preferably made from sheet metal spot-welded together and formed to define a cross sectionally polygonal axial passage 27 for reception of the central shaft 25, whereby, when the shaft 25 is inserted into the passage 27, the shaft and vanes are locked against relative rotary movement. The feeding rotor 24 is disposed in the hopper 8 in concentric relationship to the arcuate bottom 14 thereof, the radially outer edges of the vanes 26 having a sliding fit with the bottom portion 14. At its opposite ends, the rotor shaft 25 is formed to provide cross sectionally round shaft end portions 28 that are journaled in sleeve bearings 29 which are mounted in annular flanged bushing elements 30. The bushing elements 30 extend through suitable openings in the lower end portions of the end walls 11 and 12, and are rigidly detachably secured to their respective end walls 11 and 12 by self tapping cap screws or the like 31.

It will be noted that both shaft end portions 28 extend axially outwardly beyond their respective bushing elements 30. This arrangement permits the instant dispenser to be mounted on a wide variety of machines and to be easily connected to some rotary part thereof to cause rotation of the feeding rotor 24. For the purpose of the present example, and with reference to Fig. 1, it will be seen that a sprocket wheel 32 is mounted on the right hand shaft end portion 28. An endless link chain 33 runs over the sprocket 32 and a sprocket 34 journaled on a jack shaft 35 suitably mounted on the hopper 8 by conventional means not shown. Another sprocket 36 is mounted on the jack shaft 35 and is rigidly connected to the sprocket 34 for common rotation therewith. A driving sprocket wheel 37 is rigidly secured to the drive shaft 7, and an endless link drive chain 38 is entrained over the driving sprocket wheel 37 and the sprocket 36 whereby to impart feeding rotation to the rotor 24.

For the purpose of accurately metering the rate of flow of material from the hopper 8 through the discharge openings 23 in the arcuate bottom 14 thereof, I provide an elongated valve acting gate plate 39 having a cross sectionally arcuate bottom portion 40 and upwardly diverging wall portions 41. The gate element 39 nestingly receives the bottom portion of the hopper 8 and is provided with one or more discharge openings 42 identical to the hopper bottom discharge openings 23 in size, shape, number and longitudinal spacing.

Means for mounting the gate element 39 for longitudinal sliding movements relative to the hopper 8 comprises a pair of elongated plate-like supporting elements 43 and 43a, the lower longitudinal edge portions of which are inwardly and upwardly folded to provide upwardly opening hooks 44. The upper longitudinal edges of the diverging walls 41 of the gate element 39 are outwardly and downwardly turned to provide longitudinally extending flanges, each of which is engaged by a different one of the hooks 44, see Fig. 5. It will be noted that the hooks 44 and their cooperating flanges 45 extend for the greater portion of the longitudinal dimension of the hopper, so that uniform support is given to the gate element 39 for substantially the entire length thereof. This arrangement effectively prevents sagging or warping of any portion of the gate element 39 away from the hopper bottom portion 14, and insures operative contact therebetween. The supporting element 43, at its upper edge portion, is spot welded or otherwise rigidly secured to its adjacent hopper side portion 16. Adjacent its upper longitudinal edge, the supporting element 43a is provided with longitudinally spaced parallel slots 46, the longitudinal dimensions of such slots inclining toward a common end of the hopper. Anchoring screws 47 extend one each through a different one of the slots 46 and are screw threaded in the adjacent side portion 15. When the screws 47 are loosened, the operator is enabled to move the plate-like supporting element 43a in either direction of the inclined slots 46 whereby to cause generally vertical displacement of the supporting element 43a. With this arrangement, sliding engagement of the gate element 39 with the bottom portion of the hopper 8 may be adjusted to a relatively fine degree. The length and inclination of the slots 46 permit the supporting element 43a to move generally vertically downwardly a sufficient distance to release all tension between the hooks 44 and their respective flanges 45 so that the gate element 39 may be quickly and easily removed from the hopper for cleaning when such is required. Removal of the gate element 39 is accomplished by displacing one of the bushing elements 30, after which the gate may be slidably removed in a direction longitudinally thereof. The arrangement above described, wherein the supporting element 43 is fixed to the hopper, and wherein the supporting element 43a is movably mounted thereon, permits the gate element 39 to be replaced on the hopper and positioned circumferentially of the arcuate hopper bottom in precisely the relationship with the hopper bottom as was formerly had therebetween.

Engagement of the hooks 44 with the flanges 45 permits sliding movement of the gate element 39 between an inoperative position, wherein the gate element openings 42 are entirely out of registration with the hopper bottom openings 23, and various operative positions wherein the gate element openings 42 partially or wholly register with the hopper bottom openings 23. For the purpose of adjustably limiting movement of the gate element 39 towards its operative position, I provide cooperating stop members, one on the gate element 39 and the other mounted on the wall portion 15 of the hopper 8 adjacent one end thereof. The gate element mounted stop member is in the nature of a strip of angle iron 49 welded or otherwise rigidly secured to the gate element 39, the other of said stop members being in the nature of a cam 50 pivotally mounted on a wing nut equipped screw or stud 51 extending laterally outwardly from the wall portion 15 of the hopper 8. As shown in Fig. 2, the gate element 39 is cut away as indicated at 52 to permit longitudinal movement thereof relative to the hopper 8 past the cam 50. The cam 50 defines a generally volute or spiral cam surface 51 which is engaged by the adjacent end of the angle iron 49 to limit sliding movement of the gate element 39 toward its operative position. With the arm 50 positioned as shown in Fig. 2, the gate element 39 is movable to a position wherein the gate element discharge openings 42 are in full registration with their cooperating hopper bottom discharge openings 23. Obviously, rotation of the cam 50 in a counterclockwise direction with respect to Fig. 1 and Fig. 2 will cause the adjacent end of the angle iron 49 to engage the cam surface 53 of the cam 50 while the gate plate openings 42 are in but partial registration with the hopper bottom openings 23. Tightening of the wing nut on the stud 51 will cause the cam 50 to be frictionally locked in any desired set position. The gate element 39 is then movable between its inoperative closed position and the desired set operative position. The size of the aperture defined by the gate element openings 42 and their cooperating hopper bottom openings 23 determines the rate at which material will flow therethrough from the hopper 8. The gate element 39 is provided with longitudinally spaced funnel like discharge spouts 54, each of which underlies a different one of the gate element discharge openings 42. Flexible guide tubes 55 have their upper ends secured one each to a different one of the spouts 54 and have their lower ends each connected to a different one of the planting mechanisms 5 in position to deliver material discharged from the hopper 8 to desired areas on the ground. The lower ends of the guide tubes 55 may be connected to the mechanism 5 by any suitable means not shown.

Although I have shown the instant apparatus as being operative to dispense granular or powdered material and delivering the same in close proximity to the seeds being planted by the machine 1, it should be obvious that my novel dispenser may be mounted on other equipment such as used in treating growing crops. Although not shown, the instant dispenser may be mounted in a position to deliver granular or powdered insecticide directly to the leaves of taller plants such as corn and the like. While I have shown and described a commercial embodiment of my novel dispenser, it will be understood that the same is capable of modification without departure from the spirit and scope of the invention as defined in the claim.

What I claim is:

In a dispenser for granular material, an elongated hopper having a cross sectionally arcuate bottom wall portion, spaced side wall portions tangent to said bottom wall portion, and end walls, said arcuate bottom wall portion having longitudinally spaced discharge openings in the bottom thereof, a feeding rotor mounted in said hopper for rotation adjacent said arcuate bottom wall portion, a valve acting gate having an arcuate bottom portion nestingly receiving the arcuate bottom portion of said hopper, a pair of supporting elements each adjacent a different one of said hopper side wall portions and mounting said gate for sliding movements longitudinally of the hopper, said gate having discharge openings corresponding in spacing to that of the hopper bottom openings, said gate openings being movable into and out of registration with said hopper bottom openings upon sliding movements of the gate element in opposite directions, the opposite longitudinal edge portions of said gate being bent outwardly and downwardly to provide a pair of laterally spaced flanges, said supporting elements having longitudinally extended lower edge portions bent inwardly and upwardly to provide longitudinally extending upwardly opening hooks each receiving and supporting an adjacent one of said flanges, one of said supporting elements being fixed to its respective hopper side wall portion, said other supporting element having a pair of longitudinally spaced parallel slots, the longitudinal dimensions of said slots inclining toward a common end of the supporting element, and a pair of longitudinally spaced supporting screws screw threadedly mounted in the adjacent side wall portion and each thereof extending laterally outwardly through a different one of said slots, movements of said other supporting element in opposite directions longitudinally of said slots causing movement of said gate toward and away from said hopper bottom, said anchoring screws having enlarged heads engaging and releasably locking said other supporting element adjacent the side edges of said slots and against movement with respect to said hopper when said screws are tightened.

References Cited in the file of this patent

UNITED STATES PATENTS

| | | |
|---|---|---|
| 2,245,152 | Masters | June 10, 1941 |
| 2,589,425 | Newman et al. | Mar. 18, 1952 |
| 2,678,145 | Juzwiak et al. | May 11, 1954 |
| 2,723,053 | Gandrud | Nov. 8, 1955 |
| 2,778,535 | Seltzer | Jan. 22, 1957 |